United States Patent
Carr et al.

[11] Patent Number: 6,038,914
[45] Date of Patent: Mar. 21, 2000

[54] LEAK DETECTION SYSTEM FOR LIQUID PROCESSING DEVICE

[75] Inventors: Raymond A. Carr, Lutz; Brian C. Lauman, Clearwater, both of Fla.

[73] Assignee: Bristol-Myers Squibb Company, New York, N.Y.

[21] Appl. No.: 09/031,280

[22] Filed: Feb. 27, 1998

Related U.S. Application Data

[60] Provisional application No. 60/039,184, Feb. 27, 1997.

[51] Int. Cl.[7] .............................. G01M 3/04; G01N 7/00; G01R 31/02; G08B 21/00
[52] U.S. Cl. ........................ 73/40; 73/29.01; 324/549; 340/604
[58] Field of Search ................. 73/29.01, 29.05, 73/335.02, 335.03, 335.05, 40; 324/694, 676, 689, 549, 245; 340/602, 604, 605, 620

[56] References Cited

U.S. PATENT DOCUMENTS

| | | | |
|---|---|---|---|
| 4,122,389 | 10/1978 | Haagen | 324/65 |
| 4,227,190 | 10/1980 | Kelley et al. | 340/604 |
| 4,319,232 | 3/1982 | Westphal et al. | 340/604 |
| 4,480,251 | 10/1984 | McNaughton et al. | 340/604 |
| 4,535,637 | 8/1985 | Feller | 73/861.77 |
| 4,599,609 | 7/1986 | Blanchard | 340/602 |
| 4,760,383 | 7/1988 | DiLorenzo | 340/573.5 |
| 4,812,778 | 3/1989 | Gryk | 330/51 |
| 4,909,070 | 3/1990 | Smith | 73/73 |
| 4,940,543 | 7/1990 | Brown et al. | 210/369 |
| 4,985,696 | 1/1991 | Beomont | 340/618 |
| 5,077,526 | 12/1991 | Vokey et al. | 324/541 |
| 5,445,178 | 8/1995 | Feuer | 137/1 |
| 5,469,145 | 11/1995 | Johnson | 340/604 |
| 5,606,264 | 2/1997 | Licari et al. | 324/763 |
| 5,824,883 | 10/1998 | Park et al. | 73/40 |

*Primary Examiner*—Hezron Williams
*Assistant Examiner*—Jay L. Politzer
*Attorney, Agent, or Firm*—Theodore R. Furman, Jr.; John M. Kilcoyne; Staurt E. Krieger

[57] ABSTRACT

A leak sensor system for use in liquid processing equipment is disclosed. Liquid is detected by a sensing resistor whose impedance decreases dramatically in the presence of liquid. The effect of this impedance drop on the output voltage of he sensor indicates a wet or moist state which may indicate leakage from the liquid processing. A terminal resistor is in the circuit beyond the sensing resistor ro provide a warning indicator when the sensing resistor is damage or disconnected. The leak sensor system is particularly useful in centrifuge equipment, e.g., for the processing of blood.

12 Claims, 2 Drawing Sheets

LEAK DETECTION SYSTEM FOR LIQUID PROCESSING DEVICE

This application claims the benefit of U.S. Provisional Application No. 60/039,184, filed Feb. 27, 1997.

FIELD OF THE INVENTION

The present invention pertains to a method and device useful for sensing the presence of moisture or moisture leakage and is more particularly involved with an apparatus used to process a liquid which incorporates such a novel leak sensor.

BACKGROUND OF THE INVENTION

In the design of liquid processing equipment it is usually critical to substantially alleviate liquid leakage. Such leakage can be detrimental to the equipment itself and can adversely affect the desired product. Also, the liquid may present a hazard to the equipment operator. A specific example of this is blood processing equipment such as centrifuges, blood separators, plasmapheresis apparatus and the like.

Centrifugal blood separators useful for separating blood into desired fractions and isolating specific coagulation factors are disclosed in, e.g., U.S. Pat. No. 5,480,378, U.S. Pat. No. 5,603,845, PCT/US95/15669, WO 97/20635, PCT/US95/15667 and PCT/US95/15675. These devices are useful for the precise, automated preparation of blood coagulation products useful, for example, as surgical sealants. It is important for the process, product and processor to avoid leakage of the blood or blood products. Also, when such processors are used to process autologous blood, i.e., to generate blood products from the patient's own blood, the blood is typically untreated and leakage needs to be minimized to protect the operators and caregivers using such equipment.

DESCRIPTION OF PREFERRED EMBODIMENTS

The present invention comprises a novel leak detection system useful in liquid processing equipment and is particularly useful in blood processing equipment. The leak sensor of this invention provides a highly sensitive and accurate indication of liquid leakage with circuitry to significantly alleviate electromagnetic interference from the surrounding, or nearby, devices. The present sensor also incorporates safety design features which provide an error message if the sensor system is damaged or disconnected.

The leak sensor system is designed as a resistive system which is able to detect leaks by the shorting of a conductive fluid across its leads. The use of a resistive geometry for leak detection is not unique in and of itself, but the unique implementation of the accompanying circuit provides error signals if the sensor is damaged or disconnected. The present invention is described with specific reference to resistors, but any impedance devices or components could be used.

Figure 1:
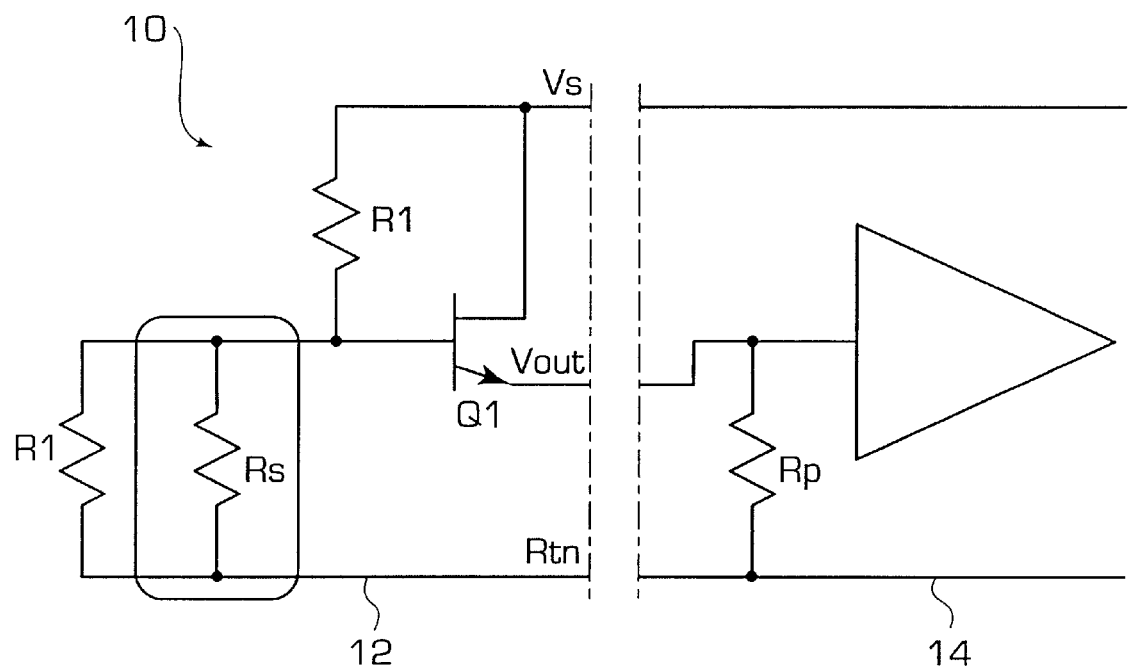
FIG. 1 shows a schematic diagram of the Leak Sensor System of the present invention.

The leak sensor system 10 of the present invention is shown if FIG. 1 comprising a leak sensor assembly 12 as it is aligned with the leak sensor interface 14.

The sensing impedance component Rs is in series with an initial impedance component, e.g., a pullup resistor $R_1$. This forms a circuit whose output voltage at the union of these two devices decreases with the application of a conductive fluid to Rs, which results in lowering the effective impedance of Rs. The impedance of a non-wet Rs is in the MOhm range thereby forcing a non-wet output at saturation. The use of a parallel resistor to Rs, e.g., a terminal impedance component, Rt, generates a non-saturated known output voltage at the union of the initial impedance component $R_1$, the terminal impedance component Rt and the sensing impedance component Rs. The terminal impedance component Rt is attached at the endpoint of the circuit through the use of the non-wet conductive path of Rs, the sensing impedance component, thereby forming a circuit whose output goes to saturation in an error state, when the sensing impedance component Rs is broken due to mishandling during installation or routine user cleaning.

In viewing FIG. 1 it can be appreciated that a prior art leak sensor assembly would not include the terminal impedance component, Rt. Accordingly, in a dry state, i.e., where Rs is not shorted by the presence of a liquid, the output voltage would be nearly identical to the output voltage if Rs were broken or missing. This is because in each case the output voltage is substantially a function of the source voltage and $R_1$. Thus, the prior art leak sensor assembly could detect moisture, but an incorrect "dry" reading may actually be noticed in a situation where the assembly is broken and malfunctioning.

In the present invention, the use of a terminal impedance component, Rt, varies the output voltage sufficiently from that realized with $R_1$ alone so that the presence or absence of Rt is clearly detectable. Thus, the integrity of the Rt/Rs subassembly is readily detectable in the present invention. Accordingly, the present leak sensor assembly is capable of producing "wet", "dry" and "broken" signals. Further, in accordance with the present invention, the placement of the terminal impedance component Rt allows for the attachment of multiple sensing impedance components Rs. The detection of the mis-connection or damage of any one or all of the sensing impedance components is accomplished by connecting them in series of the non-wet conductive path with the terminal impedance component Rt at the end of the chain.

Reduction of susceptibility to electromagnetic interference is allowed through the use of a voltage following transistor $Q_1$ configuration with Gain>>1. This design allows the termination impedance of the device to be effectively lowered to a value dictated by Rp and reduce its electrical noise susceptibility.

The placement of voltage following transistor $Q_1$ also allows for the termination of the sensor at the leak sensor interface. In this way, a pulldown resistor, Rp, is placed on the leak sensor interface. This configuration allows the detection of a disconnected sensor. If the sensor is connected then the input voltage will be in some known state above the return reference Rtn, or ground. However, if the sensor is disconnected Rp will pull the detected voltage to the return reference Rtn, or ground, and indicate an error.

Figure 2:
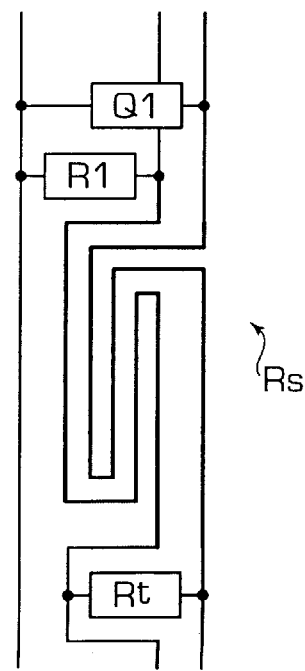
FIG. 2 shows a schematic diagram of the Leak Sensor Assembly Geometry of the device of the present invention.

FIG. 2 shows a preferred geometry of the leak sensor assembly 12 of the present invention where the sensing impedance component Rs is shown to be a bare wire arrangement. This can be obtained by any known means, e.g., by stripping or baring a portion of the metallic wiring on a printed wiring board. It can be appreciated that a liquid being introduced across the bare wiring of Rs will short the component and greatly lower the impedance, hence providing the "wet" or "leak" signal.

The present leak sensor system is connected by known means to appropriate indicators to indicate a wet or dry condition, a broken sensing impedance component or an unplugged or disconnected leak sensor assembly. These signals can further be used to carry out specific control steps for the apparatus in which it is used, such as a shut down of the processing in the case of any of the error messages.

As will be understood by those skilled in the art, the leak sensor assembly and leak sensor interface are in electrical communication via known cable and/or plug means. The values of the various components will be selected as appropriate by the skilled worker in the art. As mentioned above, the present leak sensor can be used with any liquid processing equipment. It is especially useful when used in centrifugal liquid separation/fractionation equipment, such as blood separation equipment. Such equipment is illustrated in, for example, WO 97/20635 which is directed to a centrifuge apparatus which rotates a blood processing container about is longitudinal axis at high speeds, e.g., 2,000–10,000 RPM.

Figure 3:
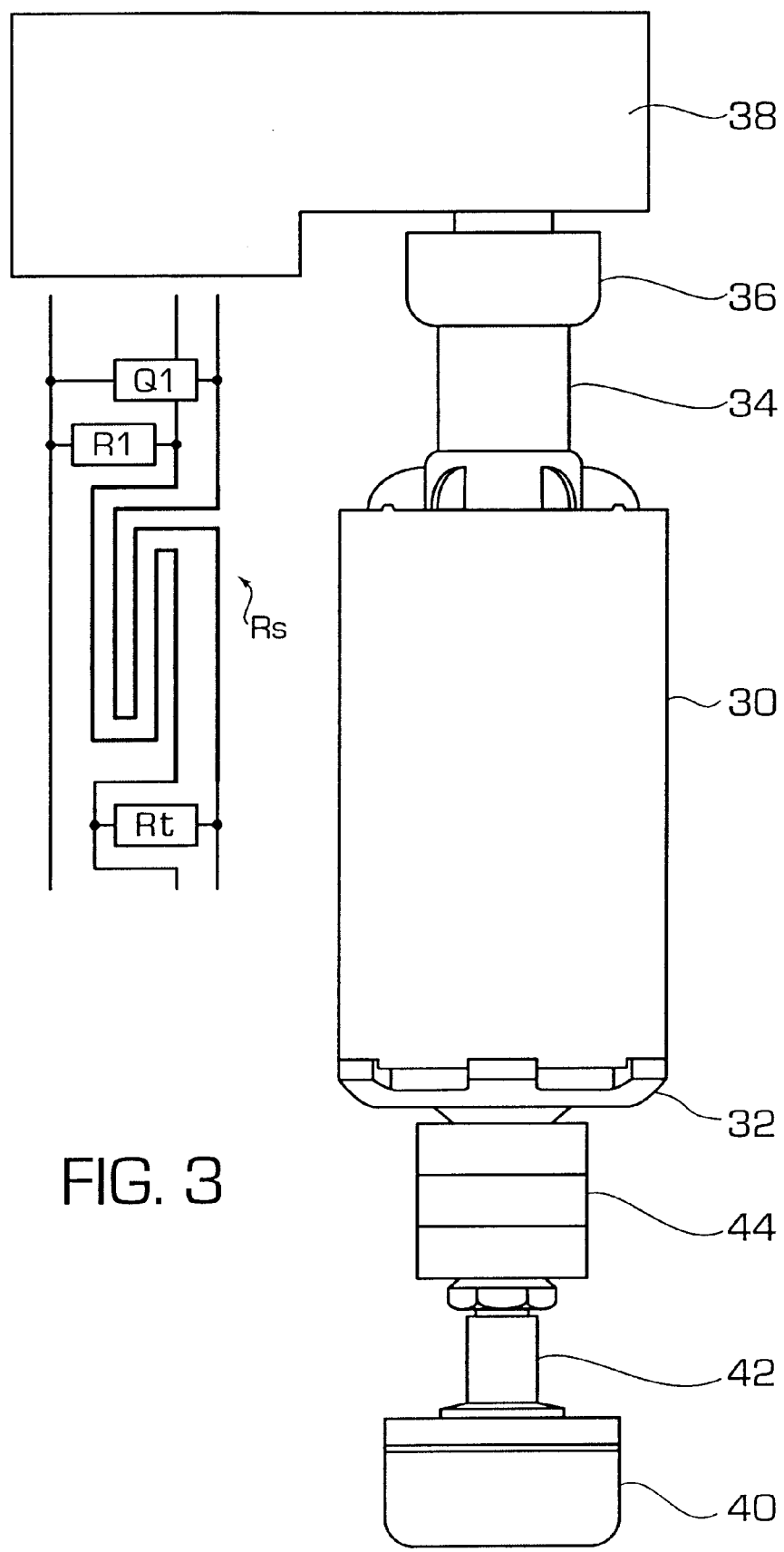
FIG. 3 shows a diagram of a centrifuge apparatus including the leak sensor system of the present invention.

FIG. 3 is an illustration of such a device wherein a container 30 is locked onto a turntable 32 at the container 30 bottom and where the container neck 34 is secured by a top locking means 36. The top locking means 36 is integral with a shaft in rotary communication with a bearing housing 38. A motor 40 rotates the container 30 via the coupling 42 and bearing 44 integral with the turntable 32. Leak sensor assembly 10 should be arranged normal to the expected path of leaking liquid. In FIG. 3 the assembly 10 is shown normal to the upper edge of the container 30. A second leak sensor assembly could also be arranged at the bottom corner of the container 30 or along the entire height of the container 30 as appropriate.

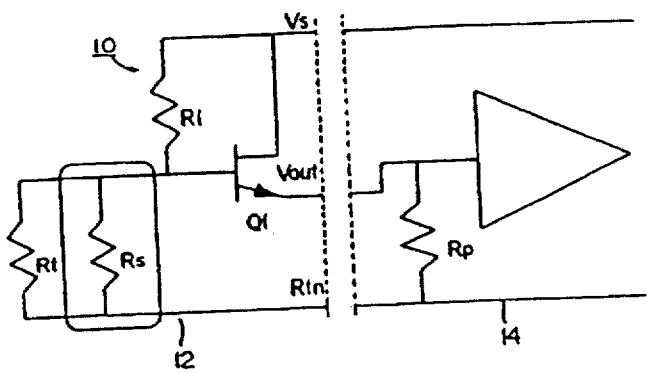

We claim:

1. A leak sensor system comprising:
   a leak sensor assembly; and
   a leak sensor interface,
   wherein said leak sensor assembly is adapted to be in electrical communication with said leak sensor interface,
   said interface provides a source voltage to said sensor assembly and receives an output voltage from said sensor assembly, and
   a comparison of said source and output voltages is indicative of a wet or dry condition sensed by said leak sensor assembly said leak sensor assembly further comprising:
   a) an initial impedance component which provides a predetermined voltage as a function of said source voltage;
   b) a sensing impedance component which has a first sensing impedance when in a dry state, and has a second sensing impedance when in contact with a conductive liquid, and which is disposed such that said output voltage is generated at a junction of said initial impedance component and said sensing impedance component as a function of said first or second sensing impedance and said predetermined voltage; and
   c) a terminal impedance component being electrically connected to said sensing impedance component and having a characteristic, such that the output voltage in said dry state is altered by said terminal impedance component to be substantially equal to the source voltage when damage to or breakage of the sensing impedance component has occurred.

2. The leak sensor assembly of claim 1 further comprising a voltage following transistor with gain significantly greater than 1, said voltage following transistor being located at the junction of said initial impedance component and said sensing impedance component whereby an improved signal-to-noise ratio of a signal to the leak sensor interface is provided.

3. The leak sensor system of claim 2 further comprising a pulldown impedance component which receives said signal from said leak sensor assembly such that if said assembly is disconnected the pulldown impedance component will pull the the signal to ground.

4. The leak sensor system of claim 1, wherein said terminal impedance component is electrically connected to said sensing impedance component and has a characteristic, such that the output voltage in said dry state is altered by said terminal impedance component to be less than the source voltage and greater than zero when damage to or breakage of the sensing impedance component has not occurred.

5. The leak sensor system of claim 1, wherein said initial impedance component and said sensing impedance component are disposed, and said second sensing impedance is, such that said output voltage in said wet state is substantially equal to zero.

6. A liquid separation apparatus for the centrifugal separation of one or more phases of a liquid comprising
   a) a liquid processing container;
   b) a securing assembly which secures said container during centrifugation and processing;
   c) a motor for centrifuging said container about its longitudinal axis; and
   d) a leak sensor system located in a proximity to said container for detecting liquid leakage from said container said leak sensor system comprising:
   a leak sensor assembly, and
   a leak sensor interface,
   wherein said leak sensor assembly is adapted to be in electrical communication with said leak sensor interface,
   said interface provides a source voltage to said sensor assembly and receives an output voltage from said sensor assembly, and
   a comparison of said source and output voltages is indicative of a wet condition associated with said liquid leakage from said container or of a dry condition of said container,
   said leak sensor assembly further comprising:
       an initial impedance component which provides a predetermined voltage as a function of said source voltage;
       a sensing impedance component which has a first sensing impedance when in a dry state, and has a second sensing impedance when in contact with a conductive liquid and which is disposed such that said output voltage is generated at a junction of said initial impedance component and said sensing impedance component as a function of said first or second sensing impedance and said predetermined voltage; and
       a terminal impedance component being electrically connected to said sensing impedance component and having a characteristic, such that the output voltage in said dry state is altered by said terminal impedance component to be substantially equal to the source voltage when damage to or breakage of the sensing impedance component has occurred.

7. The liquid separation apparatus of claim 6, wherein said terminal impedance component is electrically connected to said sensing impedance component and has a characteristic, such that the output voltage in said dry state is altered by said terminal impedance component to be less than the source voltage and greater than zero when damage to or breakage of the sensing impedance component has not occurred.

8. The liquid separation apparatus of claim 6, wherein said initial impedance component and said sensing impedance component are disposed, and said second sensing impedance is, such that said output voltage in said wet state is substantially equal to zero.

9. The liquid separation apparatus of claim 6, wherein said leak sensor assembly is arranged parallel to said longitudinal axis of said container.

10. The liquid separation apparatus of claim 6, comprising a plurality of said leak sensor assemblies arranged normal to an expected path of said liquid leaking from said container.

11. The liquid separation apparatus of claim 6, wherein said leak sensor assembly is arranged such that said sensing impedance component is disposed along an entire height of said container in said longitudinal direction.

12. The liquid separation apparatus of claim 6, wherein said container is a blood processing container.

* * * * *

UNITED STATES PATENT AND TRADEMARK OFFICE
CERTIFICATE OF CORRECTION

PATENT NO. : 6,038,914  
DATED : March 21, 2000  
INVENTOR(S) : Raymond A. Carr et al.

Page 1 of 2

It is certified that error appears in the above-identified patent and that said Letters Patent is hereby corrected as shown below:

Title page should be deleted and substitute therefore the attached title page.

Please delete Figures, 1, 2 and 3 and insert attached new Figures 1, 2 and 3.

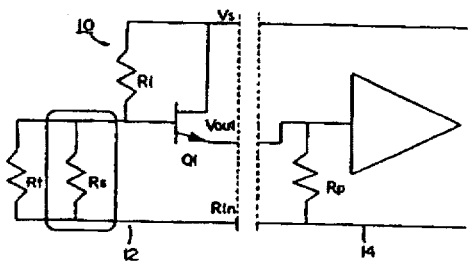

FIG. 1

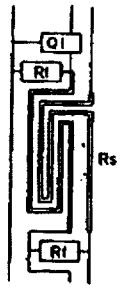

FIG. 2

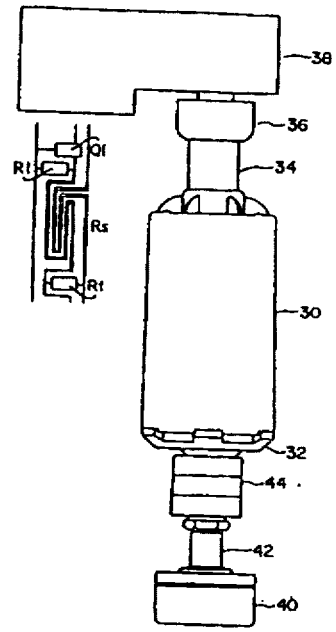

FIG. 3

Signed and Sealed this

Eleventh Day of December, 2001

*Attest:*

NICHOLAS P. GODICI
*Attesting Officer*  *Acting Director of the United States Patent and Trademark Office*

United States Patent [19]
Carr et al.

[11] Patent Number: 6,038,914
[45] Date of Patent: Mar. 21, 2000

[54] LEAK DETECTION SYSTEM FOR LIQUID PROCESSING DEVICE

[75] Inventors: Raymond A. Carr, Lutz; Brian C. Lauman, Clearwater, both of Fla.

[73] Assignee: Bristol-Myers Squibb Company, New York, N.Y.

[21] Appl. No.: 09/031,280

[22] Filed: Feb. 27, 1998

Related U.S. Application Data

[60] Provisional application No. 60/039,184, Feb. 27, 1997.

[51] Int. Cl.[7] .................. G01M 3/04; G01N 7/00; G01R 31/02; G08B 21/00
[52] U.S. Cl. .................. 73/40; 73/29.01; 324/549; 340/604
[58] Field of Search .................. 73/29.01, 29.05, 73/335.02, 335.03, 335.05, 40; 324/694, 676, 689, 549, 245; 340/602, 604, 605, 620

[56] References Cited

U.S. PATENT DOCUMENTS

| | | | |
|---|---|---|---|
| 4,122,389 | 10/1978 | Haagen | 324/65 |
| 4,227,190 | 10/1980 | Kelley et al. | 340/604 |
| 4,319,232 | 3/1982 | Westphal et al. | 340/604 |
| 4,480,251 | 10/1984 | McNaughton et al. | 340/604 |
| 4,535,637 | 8/1985 | Feller | 73/861.77 |
| 4,599,609 | 7/1986 | Blanchard | 340/602 |
| 4,760,383 | 7/1988 | DiLorenzo | 340/573.5 |
| 4,812,778 | 3/1989 | Gryk | 330/51 |
| 4,909,070 | 3/1990 | Smith | 73/73 |
| 4,940,543 | 7/1990 | Brown et al. | 210/369 |
| 4,985,696 | 1/1991 | Beomont | 340/618 |
| 5,077,526 | 12/1991 | Vokey et al. | 324/541 |
| 5,445,178 | 8/1995 | Feuer | 137/1 |
| 5,469,145 | 11/1995 | Johnson | 340/604 |
| 5,606,264 | 2/1997 | Licari et al. | 324/763 |
| 5,824,883 | 10/1998 | Park et al. | 73/40 |

*Primary Examiner*—Hezron Williams
*Assistant Examiner*—Jay L. Politzer
*Attorney, Agent, or Firm*—Theodore R. Furman, Jr.; John M. Kilcoyne; Staurt E. Krieger

[57] ABSTRACT

A leak sensor system for use in liquid processing equipment is disclosed. Liquid is detected by a sensing resistor whose impedance decreases dramatically in the presence of liquid. The effect of this impedance drop on the output voltage of he sensor indicates a wet or moist state which may indicate leakage from the liquid processing. A terminal resistor is in the circuit beyond the sensing resistor ro provide a warning indicator when the sensing resistor is damage or disconnected. The leak sensor system is particularly useful in centrifuge equipment, e.g., for the processing of blood.

12 Claims, 2 Drawing Sheets